May 26, 1964  G. S. HARBEN, JR  3,134,135
AUTOMATIC POULTRY SHACKLE
Filed Dec. 1, 1960  2 Sheets-Sheet 1

INVENTOR.
GROVER S. HARBEN, JR.
BY

ATTORNEY

May 26, 1964   G. S. HARBEN, JR   3,134,135
AUTOMATIC POULTRY SHACKLE
Filed Dec. 1, 1960   2 Sheets-Sheet 2
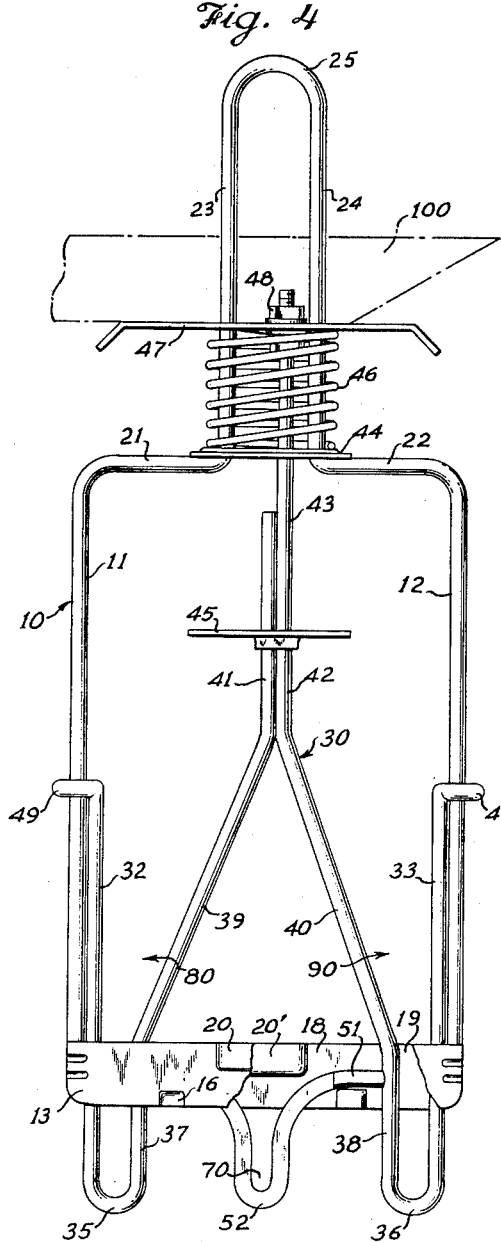
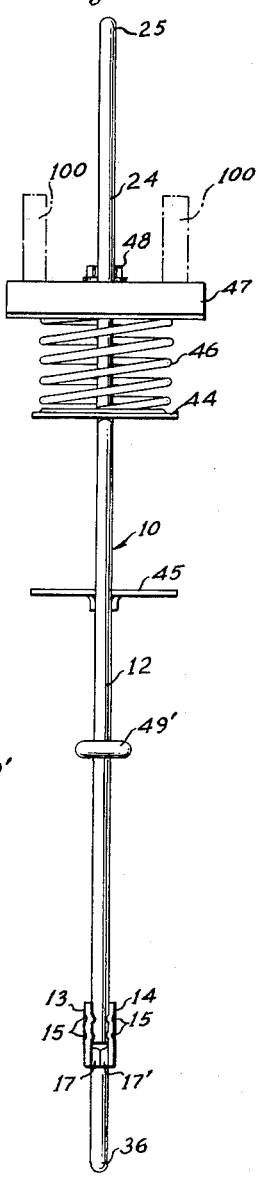
INVENTOR.
GROVER S. HARBEN, JR.
BY 
ATTORNEY

United States Patent Office 3,134,135
Patented May 26, 1964

3,134,135
AUTOMATIC POULTRY SHACKLE
Grover S. Harben, Jr., Gainesville, Ga., assignor to Gainesville Machine Co., Inc., Gainesville, Ga., a corporation of Georgia
Filed Dec. 1, 1960, Ser. No. 73,136
3 Claims. (Cl. 17—44.1)

The present invention relates to an automatic poultry shackle and is more particularly concerned with a shackle or suspension device of the type employed to support fowls when they are being killed, scaled, picked or otherwise treated during processing operations.

In the past many shackles for use in the processing of poultry have been developed. Most of these prior art devices support the poultry by the legs or by the head. Usually such devices are complicated, and, especially where it is desired automatically to release the poultry at a predetermined station in its travel, devices for accomplishing this purpose have included various clamping arrangements utilizing hinged parts. Since these parts are subjected to heat and moisture almost constantly, the parts wear out, become corroded or rusted, and thus become either inoperative or unsatisfactory in operation.

Other less complicated devices have been developed to overcome the disadvantage of having hinged and spring loaded parts but these devices usually require manual unloading. Such a shackle is shown in U.S. Patent No. 2,613,390. The shackle disclosed in that patent operates very nicely, but nevertheless, each fowl inserted on the shackle must be removed from the hot shackle by hand. In so doing, the operator normally lifts the fowl by its legs, if the head is engaged by the shackle, or by its neck if the legs are engaged by the shackle. This is a time consuming operation which is costly.

On the other hand, the automatically releasable shackles are usually difficult to handle when attaching the live fowl thereto because both legs must be simultaneously inserted in the shackle and held in place as the shackle is closed.

Accordingly, it is an object of the present invention to provide an automatic shackle having few moving parts and having no hinged parts.

Another object of my invention is to provide an automatic shackle in which the leg portions of the fowl do not need to be inserted simultaneously.

Another object of my invention is to provide an automatic shackle which may be selectively operated as an automatically releasable shackle or a manually operated shackle without adjustment of parts.

Another object of my invention is to provide an automatic shackle which will support the fowl by its legs and/or by its neck without adjustment and will automatically release the legs and neck simultaneously.

Another object of my invention is to provide a shackle in which a fowl is easily and effectively inserted and retained.

Another object of my invention is to provide an automatic shackle which will effectively release the fowl at a predetermined location.

Another object of my invention is to provide an automatic shackle which is inexpensive to manufacture, durable in construction and efficient in operation.

Other and further objects, features and advantages of the present invention will become apparent from the following description when taken in conjunction with the accompanying drawings in which like characters of reference designate corresponding parts throughout the several views, and wherein:

FIG. 4 is a front elevation similar to FIG. 1 showing the elements of the poultry shackle in poultry releasing position.

FIG. 5 is a side elevation of the automatic poultry shackle shown in FIG. 4.

Figure 1:
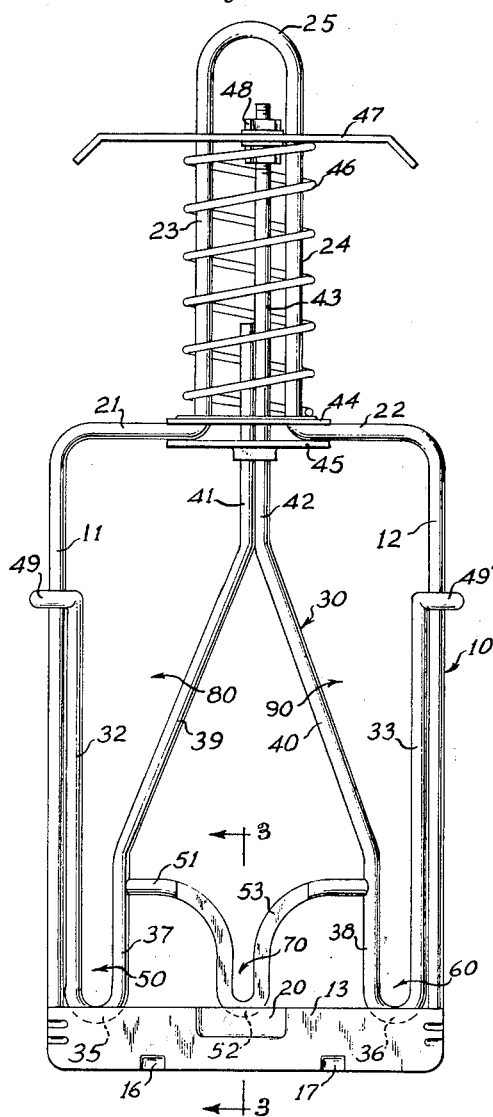
FIG. 1 is a front elevation or face view of the automatic poultry shackle constructed in accordance with the present invention, the elements thereof being in position to receive a fowl by its legs or by its head.
Figure 2:
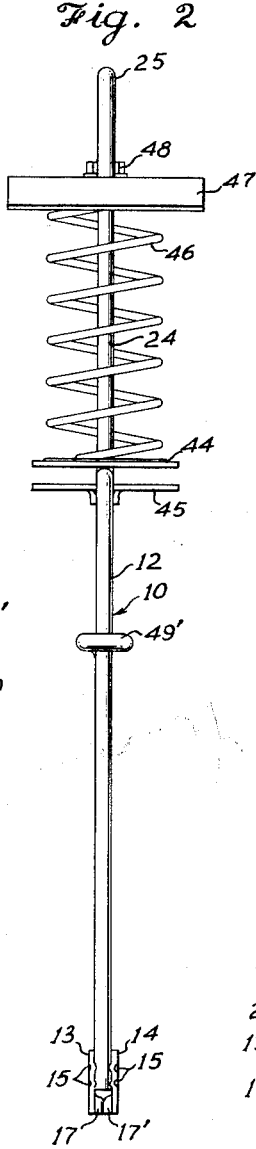
FIG. 2 is a side elevation of the automatic poultry shackle shown in FIG. 1.
Figure 3:
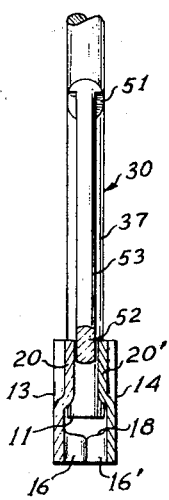
FIG. 3 is a cross sectional view taken along line 3—3 in FIG. 1.

Referring now in detail to the embodiment chosen for the purpose of illustrating the present invention, numeral 10 denotes generally an outer ejector frame within which an inner poultry retaining frame 30 is movable. The arrangement of parts is such that upon relative movement between the frames, the outer frame 10 will cause the fowl to be released from the inner frame 30. The two frames 10 and 30 are preferably made mainly from a non corrosive metal rod or metal rod treated to render it corrosive-resistant.

According to the present invention, the outer ejector frame 10 includes a pair of vertically extending side members 11 and 12 which extend downwardly in parallel spaced relationship to each other. The lower end portions of the side members 11 and 12 are joined by a pair of spaced parallel ejector bars or plates 13 and 14, the end portions of the plates 13 and 14 being provided with inwardly protruding spacers 15 welded to the front and back sides respectively of the side members 11 and 12. The plates 13 and 14 serve as a means for discharging the legs of the fowl from the inner retaining frame 30 when it is moved downwardly with respect to the outer ejector frame 10.

Intermediate the ends and along the lower edges of the ejector plates 13 and 14 there are provided spaced opposed pairs of inwardly struck spacer members 16, 16', 17, 17' which abut each other, the spacer members 16, 16' being welded together and the spacer members 17, 17' being welded together. Thus are provided a central slot 18 and a pair of side slots 19, the central slot 18 being defined by the ejector plates 13 and 14 and spacer members 16, 16', 17, 17', and the side slots 19 being defined by side member 11, ejector plates 13 and 14 and spacer members 16, 16', and by side member 12, ejector plates 13 and 14 and spacer members 17, 17', respectively.

In the central upper portion of the ejector plates 13 and 14 are provided opposed inwardly struck guide plates 20, 20' which project into the central slot 18 to provide spaced parallel bearing surfaces to guide the inner frame 30 in its travel in the outer frame 10.

Referring now to the upper portion of outer ejector frame 10, it will be seen that the upper ends of side members 11 and 12 are turned inwardly to provide a pair of aligned top members 21 and 22 which extend toward each other. Inwardly of the side members 11 and 12, the top members 21 and 22 bend upwardly to provide a pair of spaced longitudinal suspension bars 23 and 24 which extend parallel to each other, the upper portions of suspension bars 23 and 24 being integrally joined to form suspension loop 25.

The inner frame 30 includes a pair of spaced, downwardly extending, parallel side bars 32 and 33 running inwardly adjacent the intermediate and lower portions of side members 11 and 12. At their lower ends the side bars 32 and 33 are bent inwardly and then upwardly rather sharply to form loops, as indicated at 35 and 36, and then extend upwardly to form the inner longitudinal bars 37 and 38. The inner bars 37 and 38 continue upwardly, converging toward each other, as at 39 and 40, to join at the central upper portion of the inner frame 30. Thence, the inner bars 37 and 38 run parallel and adjacent to each other, as at 41 and 42, to terminate within the confines of suspension bars 23 and 24. An actuator bar 43 formed as an extension of inner bar 38 terminates well above top members 21 and 22 to constitute a suspension member by which the inner frame 30 is supported.

The lower or base portions of the inner bars 37 and 38 extend substantially parallel to the side bars 32 and 33, and the spacing between the bars 32 and 37 forms a leg receiving recess, space or notch 50 while a similar spacing 60, between the side bar 33 and the inner bar 38 constitutes a second leg notch, space or recess. The loops or bends 35 and 36 at the lower end of the inner frame 30 extend, respectively, within the slots 19.

For selectively receiving the neck of a fowl, a transverse bar 51 is provided, with its ends secured to the inner surfaces of inner bars 37 and 38, respectively. The bar 51 extends from its ends inwardly and downwardly forming at its central portion a V-shaped central loop 52 entering into slot 18 between bearing plates 20, 20'. The central portion of bar 51 is flattened, as at 53, so that this central portion is of less thickness than the space between bearing plates 20, 20'. Thus is provided a space 70 for receiving the neck of a fowl.

Encompassing the suspension bars 23 and 24 and resting upon the top members 21 and 22 is a bearing collar 44 through the central portion of which the actuator bar 43 is movable. A complementary fixed collar 45 is securely fixed on the parallel portions 41 and 42 of inner bars 37 and 38 to engage the lower surfaces of top members 21 and 22 and thereby limit the upward movement of actuator bar 43. Coiled around the suspension bars 23 and 24 is a helical spring 46, the lower end of which abuts against the top of collar 44.

A camming member is provided at the upper end of actuator bar 43 and is retained in place by an internally threaded nut 48, threadedly engaging external threads on the upper end of actuator bar 43. The upper end of spring 46 acts against camming member 47 so as to urge the inner frame 30 to a poultry receiving position as shown in FIG. 1. Of course, when the outer frame 10 is restrained against downward movement, as by suspension on a conveyor chain, and the camming member 47 depressed, the inner frame 10 is urged downward against the tension of spring 46 to a poultry releasing position, as shown in FIG. 4.

The camming member 47 is preferably a flat plate or elongated sheet having wings extending in a horizontal plane outwardly of the longitudinal suspension bars 23 and 24, there being provided appropriate apertures in the camming member 47 so that it may slide along bars 23 and 24. The extreme opposite ends of the camming member 47 are bent downwardly at an angle from the plane of the remaining portion.

For guiding the inner frame 30 in its travel, the upper end of side bars 32 and 33 terminate below top members 21 and 22 and are provided with horizontal loops 49 and 49' extending around the side members 11 and 12, respectively. These loops 49 and 49' thus form apertures which slidably journal side bars 32 and 33 on the side members 11 and 12, respectively.

It is therefore seen that I have provided a retaining frame 30 having wedge members defined by side bars 32 and 33 and inner bars 37 and 38 forming loops at its lower end, and an actuator bar 43 at its opposite upper end. The space 50 between side bar 32 and inner bar 37 is sufficient to receive the leg of a fowl but is insufficient for the foot of a fowl to pass therethrough. The wider open space 80 above the space 50, however, is sufficient to permit ready passage of the foot of a fowl therethrough. Similarly, space 60 is insufficient for the foot of a fowl to pass therethrough, but the space 90 thereabove is sufficient. Also, the space 70 defined by the bar 51 is sufficient to receive the neck of a fowl but insufficient to permit the passage of the head therethrough, while the space thereabove is sufficient to permit the passage of the head of the fowl.

From the foregoing description, the operation of the present device is apparent. The device is suspended by a chain (not shown) of the usual conveyor system in a poultry process plant. The feet of a fowl are then inserted through the spaces 80 and 90 as the shackle is suspended in its poultry receiving position, as shown in FIG. 1. Immediately after the feet are inserted through spaces 80 and 90, the fowl is moved downwardly so that the lower leg portions of the fowl are wedged or suspended within the spaces 50 and 60. All of this, of course, is accomplished in a very short period of time. The fowl is then carried with its body suspended from the shackle by its feet and legs through the usual process wherein the fowl is killed, dipped in scalding water and the feathers beat from the body by opposed rotating drums having picker fingers. The fowl is then eviscerated and is carried to an unloading zone where there are arranged a pair of cam actuating members 100, between which the chain of the conveyor travels. These cam actuating members 100 have downwardly inclined lower surfaces which, as the shackle is moved by the conveyor, engage the upper surface of the camming member 47 and gradually urge it downwardly to the poultry releasing position shown in FIG. 4. As the camming member 47 is urged downwardly, it carried with it the actuator bar 43 which moves the entire inner frame 30 downwardly. Therefore, the wedge members, comprising the lower portions of side bars 32 and 33 and the lower portion of inner bars 37 and 38, project within the slots 19. As the wedge members move within the slots 19, the ejector bars 13 and 14 engage the legs of the fowl substantially simultaneously and hold these legs against downward movement as the inner frame 30 continues its downward movement. Thus, eventually, as the inner frame 30 approaches its position as shown in FIG. 4, the legs of the fowl are moved relative to the inner frame 30 to the spaces 80 and 90 where the pull of gravity on the body of the fowl urges the legs out of engagement with the wedge members and the feet of the fowl pass through spaces 80 and 90, thereby automatically disengaging the fowl from the shackle. Thence, the fowl falls by gravity into a suitable receptacle (not shown) at a predetermined position in the travel of the shackle along the conveyor system.

It will be understood, of course, that the neck of the fowl may be inserted in similar manner in the space 70, in place of the legs being inserted in the spaces 50 and 60. As the inner frame 30 moves downwardly, the neck will be retained at substantially the same elevation by the ejector plates 13 and 14 and hence the neck of the fowl will be urged to the larger space above space 70 of the inner frame 30, thereby permitting the pull of gravity on the body of the fowl to pull the head through this larger space and disengage the fowl.

It will be obvious to those skilled in the art that many variations may be made in the embodiment chosen for purpose of illustrating the present invention without departing from the scope thereof as defined by the appended claims.

I claim:

1. An automatic shackle comprising an outer frame having parallel side members and ejector means extending from said side members, and an inner frame reciprocatable with respect to said outer frame from a poultry receiving position to poultry ejecting position, said inner frame having wedge members extending longitudinally of the inner frame to provide a relatively small space between their lower portions, there being a relatively larger space thereabove, said smaller space being adjacent said ejector means when said inner frame is in its poultry receiving position, said wedge members being movable downwardly with respect to said ejector means when said inner frame is moved to a poultry ejecting position, and freely slidable means connected to and extending outwardly in opposite directions from said inner frame for slidably journalling said side members intermediate the ends of said side members.

2. An automatic shackle comprising an inner frame having side means forming loops at their lower ends for receiving the legs of a fowl and actuator means for reciprocating said frame, an outer frame having suspension means, a pair of parallel side means supported by said suspension means, and ejector plates on opposite sides of said inner frame adjacent said loops, said ejector plates being secured to said side means of said outer frame, and journal means for securing the upper ends of said side means of said inner frame intermediate the ends of said side means of said outer frame and in freely slidable relationship to said side means of said outer frame, said journal means being secured to the side means of said inner frame and extending approximately horizontally therefrom for slidably journalling the side means of said outer frame.

3. An automatic shackle comprising an outer frame and an inner frame within said outer frame, said outer frame having a suspension loop by which said shackle is supported, a pair of aligned diverging top members carried by said suspension loop, said top members having ends, a pair of parallel vertically disposed side members depending from the ends of said top members, said side members being disposed in a common plane, and an ejector member extending between and joining the ends of said side members, said inner frame having a pair of parallel side bars disposed in said common plane and parallel to said side members, horizontally disposed opposed outwardly extending guide loops connected to said side bars and encompassing said side members intermediate the ends of said side members, said loops being freely slidable along said side members, poultry carrying loops at the lower ends of said side bars for retaining the feet of poultry therein, said loops being disposed adjacent said ejector member so that upon movement of said inner frame downwardly said feet will be engaged and ejected by said ejector member from said loops, a spring disposed between said inner frame and said outer frame for urging said inner frame upwardly with respect to said outer frame, a collar carried by said inner frame and engageable with the diverging top members of said outer frame for limiting the upward movement of said inner frame so that said spring normally maintains said poultry carrying loops above said ejector member, and means by which said inner frame is moved downwardly with respect to said outer frame when the loops are to discharge said feet.

References Cited in the file of this patent
UNITED STATES PATENTS

| | | |
|---|---|---|
| 2,797,436 | Shadley | July 2, 1957 |
| 3,044,109 | Wayne | July 17, 1962 |